United States Patent [19]

Hsu

[11] Patent Number: 4,543,648
[45] Date of Patent: Sep. 24, 1985

[54] SHOT TO SHOT PROCESSING FOR MEASURING A CHARACTERISTIC OF EARTH FORMATIONS FROM INSIDE A BOREHOLE

[75] Inventor: Kai Hsu, Danbury, Conn.

[73] Assignee: Schlumberger Technology Corporation, New York, N.Y.

[21] Appl. No.: 566,631

[22] Filed: Dec. 29, 1983

[51] Int. Cl.⁴ .......................... G01V 1/28; G06F 15/20
[52] U.S. Cl. ........................................ 367/29; 367/33; 364/422
[58] Field of Search ....................... 367/25, 27, 29, 33, 367/50; 364/422

[56] References Cited

U.S. PATENT DOCUMENTS

| | | | |
|---|---|---|---|
| 4,131,875 | 12/1978 | Ingram . | |
| 4,210,966 | 7/1980 | Ingram . | |
| 4,327,412 | 4/1982 | Tininans | 364/422 |
| 4,338,664 | 7/1982 | Mayer | 364/422 |
| 4,397,004 | 8/1983 | Bronislaw | 367/34 |
| 4,460,986 | 7/1984 | Millout et al. | 367/27 |
| 4,495,816 | 1/1985 | Schlumberger | 364/422 |

OTHER PUBLICATIONS

Article entitled "A New Approach to Sonic Loggin and Other Acoustic Measurements", by Kokesh et al., Published in the Mar. 1965 Issue of the Journal of Petroleum Technology, pp. 282-286.
Article entitled: "Data Adaptive Spectral Analysis Methods", by R. T. Lacoss, Published in Geophysics, vol. 36, No. 4, (Aug. 1971), pp. 661-675, 7 FIGS., 3 Tables.

Primary Examiner—Nelson Moskowitz
Attorney, Agent, or Firm—Louis H. Reens; Stephen L. Borst; David H. Carroll

[57] ABSTRACT

A method and apparatus for measuring an earth formation characteristic from inside a borehole penetrating earth formations is described. A tool carrying a sonic transmitter and an array of receivers is moved along the borehole and waveform signals from the receiver array are generated from repetetive operations of the transmitter. Sub-arrays of particularly related waveform signals relevant to a selected depth interval that is less in length than the aperture of the array are identified. Each sub-array of signals is then converted to a domain of signals composed of values of a coherence as a function of a range of values of a characteristic such as slowness. The converted signals are then combined so as to provide combined coherence values as a function of different values of the characteristic. One or several peaks of the combined coherence values are detected and determine the value of the characteristic for the selected depth interval. Similar processing is continued for other depth intervals. Independent measurements of the characteristic can be made with both receiver section and transmitter section processing and a borehole compensation technique is described. A fast processing technique for processing data of many sub-array waveforms is described.

44 Claims, 12 Drawing Figures

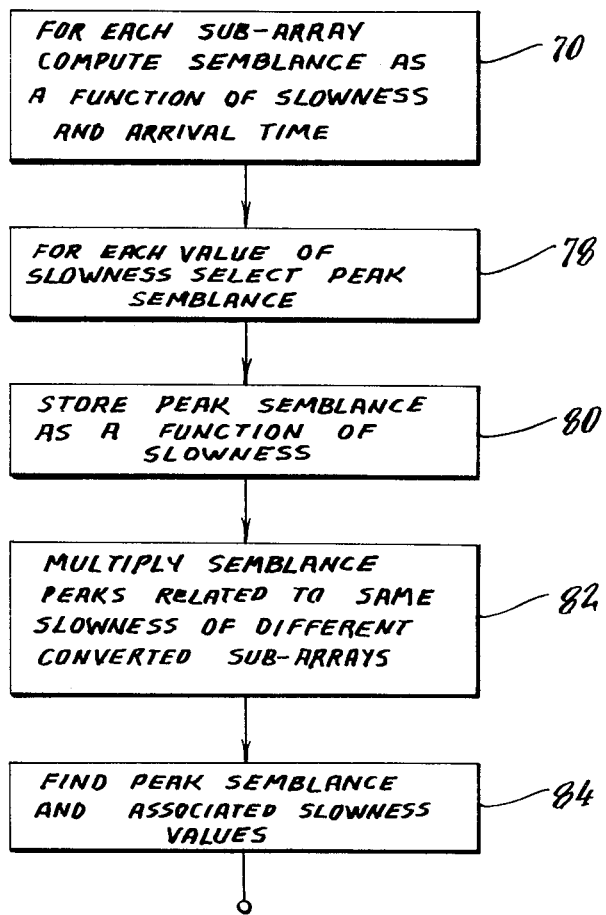
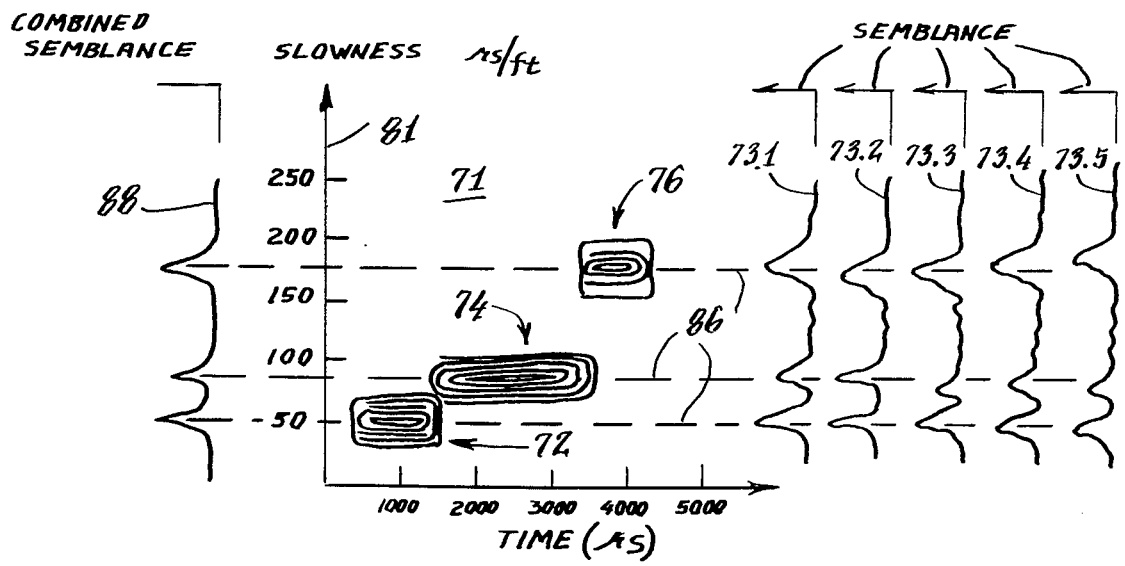

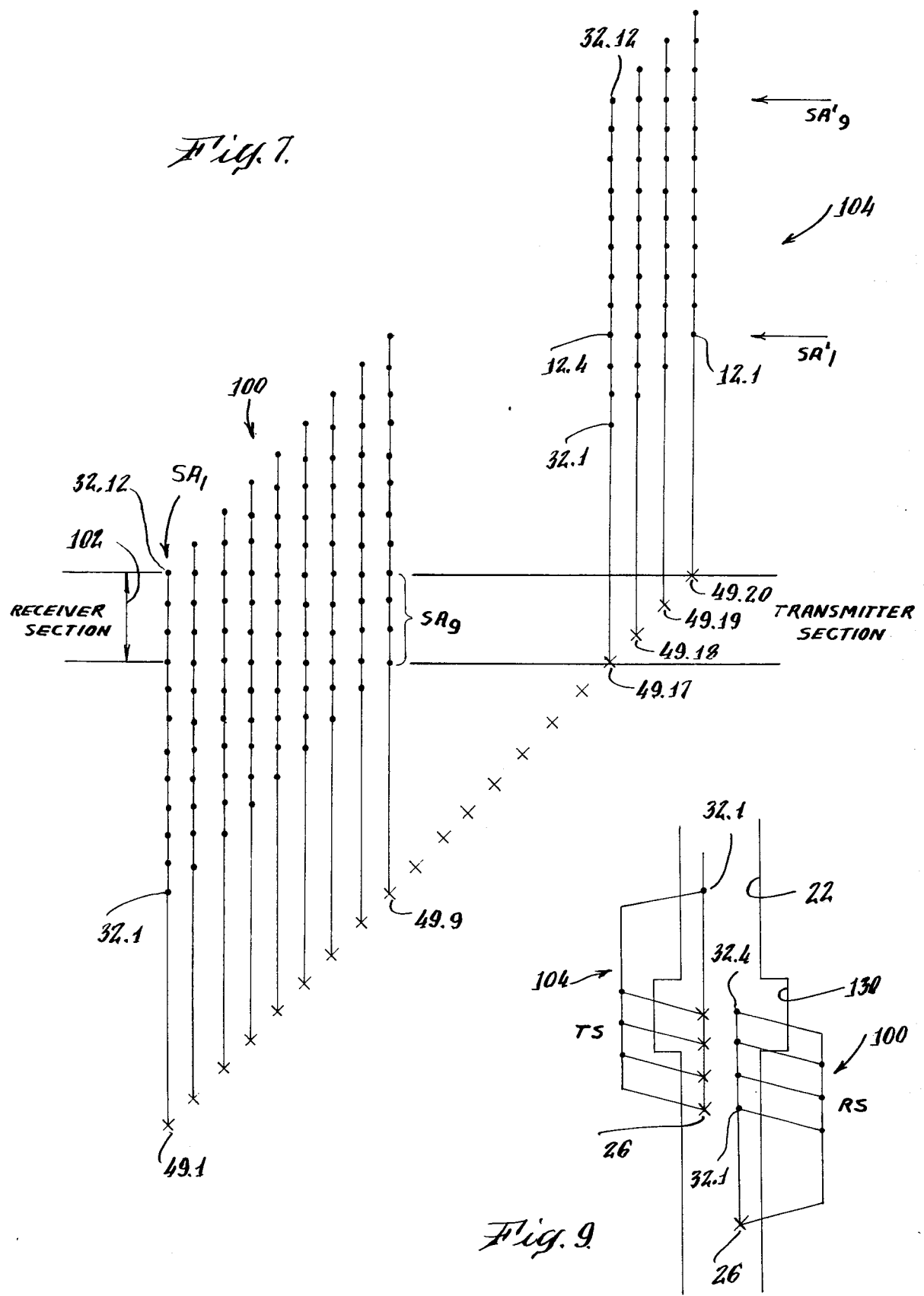

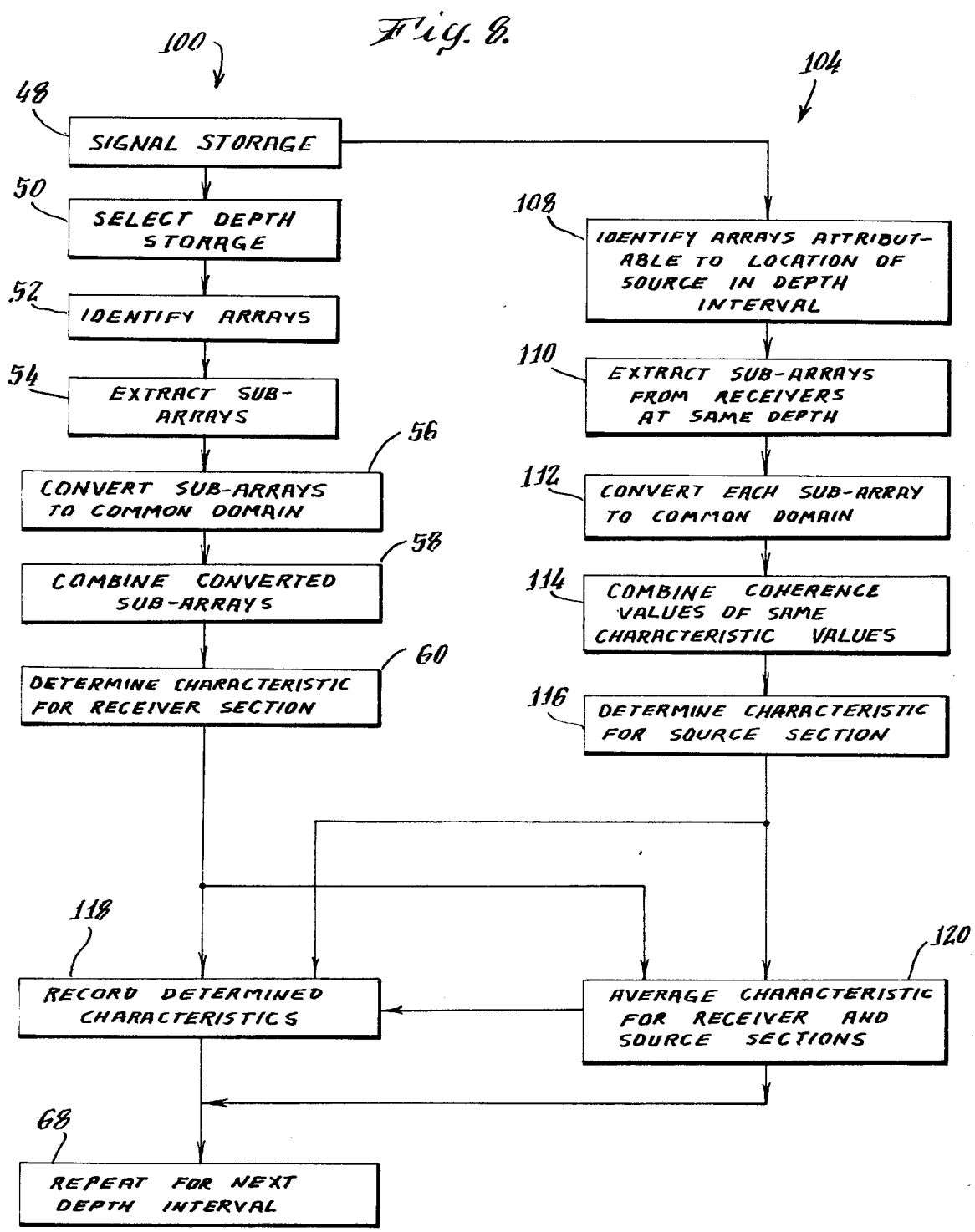

SHOT TO SHOT PROCESSING FOR MEASURING A CHARACTERISTIC OF EARTH FORMATIONS FROM INSIDE A BOREHOLE

FIELD OF THE INVENTION

This invention generally relates to a method and apparatus for measuring a characteristic of earth formations penetrated by a borehole. More specifically this invention relates to a method and apparatus for measuring an acoustic characteristic such as slowness of sonic waves after these traverse earth formations adjoining a borehole or passed through a section of the borehole.

BACKGROUND OF THE INVENTION

The generation and subsequent recording of sonic waves is a key measurement employed in oil well logging. Traditionally, a key characteristic estimated from waveforms has been the formation compressional slowness (the reciprocal of velocity). Since for an uncased borehole the compressional head wave is the first arrival in the waveform, the compressional slowness can be estimated merely by measuring the first time of arrival of energy at two receivers located a known distance apart. A drawback of this method is that the first arrival detection time is prone to error in the presence of noise spikes. Also, in a cased borehole with poorly bonded cement, a strong casing wave usually arrives before the compressional head wave and tends to interfere with its detection.

In recent years attempts have been made to extract additional information from sonic waveforms, such as the compressional and shear waves, U.S. Pat. No. 4,210,966 to Ingram and the Stoneley wave U.S. Pat. No. 4,131,875 to Ingram. These patents describe a multiple fold cross-correlation technique to determine the slowness of these waves from a plurality of waveforms detected by an array of receivers.

Techniques have been employed and described wherein a sonic tool is used with a receiver array containing a large number of receivers, such as 12. See copending U.S. patent application Ser. No. 335,758 filed on Dec. 30, 1981 by Christopher V. Kimball and Thomas L. Marzetta entitled "Sonic Well Logging" and assigned to the same assignee as for the present invention.

Signal processing methods are needed to estimate the acoustic slownesses of interest from the recorded arrays of waveforms. As in other signal processing applications, there is always a fundamental tradeoff between resolution and measurement statistics (i.e., accuracy, or variance). In acoustic logging, as the array aperture gets longer, the quality of the slowness estimate increases while the resolution decreases. This occurs since the processing tends to average, or smooth, the actual slowness variation in the vicinity of the array over the length of the aperture. As the array aperture increases, more averaging occurs, and resolution is sacrificed for improved statistics. Conversely, a short aperture provides less averaging, gives a noisier estimate but is more responsive to rapid variations.

Besides the fundamental resolution-versus-statistics tradeoff, the wavelength at acoustic frequencies also plays a fundamental role in that it limits the resolving power of the method. As a rule of thumb, one cannot resolve variations in the slowness which occur over distances much less than a wavelength. An acoustic wavelength, assuming a sound speed of 6 km/s, at 10 kHz is roughly 2 feet. Slower sound speeds have proportionately shorter wavelengths. Accordingly, sonic logging methods may resolve beds on the order of a foot thick or more when the operating frequency is approximately 10 kHz.

Sonic array processing methods such as the slowness-time coherence (STC) process described in the foregoing Kimball et al patent application and the maximum likelihood method as described in an article entitled "High Resolution Phase Velocity Spectra Estimation" by A. Baggeroer et al and presented at pages 471, 472 of the International Conference On Digital Signal Processing held in Florence, Italy on Sept. 2-5, 1981 among others are distinctly different, but have two important features in common. Each processes the data associated with a given source shot independent of the data associated with all other several shots and each is based on the assumption that the formation is homogeneous across the receiver aperture. In practice the formation is unlikely to be homogeneous, particularly over long intervals as an aperture formed by a twelve receiver array using six inch spacing between receivers. Furthermore, if a shorter array is used to achieve a resolution of the order of a foot, the measurement tends to be noisy.

Techniques have been proposed to provide borehole compensated sonic logs. One such method is described in an article entitled "A New Approach To Sonic Logging And Other Acoustic Measurements" by Kokesh et al and published in the March, 1965 issue of the Journal of Petroleum Technology. In this technique a pair of sonic transmitters are used, one below and one above four receivers. Two interval transit time (slowness) measurements are made by different pairs of receivers for the same depth intervals but using sonic pulses generated by the different transmitters. The interval measurements are combined and averaged to obtain a slowness measurement which is compensated for different conditions such as cave-ins and tooltilts.

SUMMARY OF THE INVENTION

With a method and apparatus in accordance with the invention, an earth formation characteristic may be measured with enhanced vertical resolution and statistical accuracy. This is obtained by utilizing overlapping information in waveforms detected from different times of operation of the source with an array of receivers that extends over a greater distance than the depth interval of interest. This enables an improvement in the vertical resolution by reducing the depth interval of interest, for example, to that of the order of a wavelength, while improving the quality of the statistical information. Correlated information is used that has been obtained from successive operations of the source.

With a method and apparatus in accordance with the invention, the length of an array of receivers can be kept long without degrading vertical resolution or statistical accuracy. This is done by employing a technique with which the overlapping information in waveforms associated with different times of operation of the source contribute to the determination of the characteristic of interest for selected depth intervals.

For example and with reference to one form of a method and apparatus in accordance with the invention, an array of sonic receivers is employed with a sonic transmitter. The receiver array may have a long aperture by using, for example, twelve receivers at six inch spacings at a substantial distance from the sonic transmitter. As the tool is moved at a logging speed through the borehole, the sonic transmitter is repetetively actuated at a relatively high frequency to introduce successive shots of acoustic energy into the borehole. Because the logging speed of the tool is slow relative to successive operations of the sonic transmitter, the array shifts only a fraction of the receiver aperture between successive shots. As a result the receiver waveforms associated with different shots carry information about overlapping depth intervals and, therefore, are effectively highly correlated.

Sub-arrays of waveform signals attributable to successive sonic transmitter shots and relevant to a selected depth interval are identified. In one technique in accordance with the invention and referred to as receiver section processing, the sub-arrays of signals are selected such that the signals in each sub-array are attributable to different source shots when receivers, with which a sub-array of signals is detected, are within the selected depth interval. In another technique in accordance with the invention and referred to as transmitter section processing the sub-arrays of signals are attributable to operations of the sonic transmitter while it is within the selected depth interval.

In each technique of processing the sub-arrays associated with the selected depth interval are converted to a common domain of signals representing values of a coherence between the signals as a function of values of an earth formation characteristic such as slowness.

The coherence values of the converted signals for effectively corresponding characteristic or slowness values and relevant to the selected depth interval are then combined in a manner whereby one or several characteristic values representative of the best coherence can be determined for the selected depth interval. This process is repeated for different depth intervals so that a tangible record as a function or borehole depth can be formed for the characteristic.

With a technique in accordance with the invention a large number of waveforms relevant to any one selected depth interval are employed to derive the earth formation characteristic. The number of waveforms exceeds the number of receivers depending upon the size of the depth interval, the length of the receiver array aperture and the distance that the array of receivers shifts between successive times of operation of the source.

With a technique in accordance with the invention a large number of independent measurements yielding correlatable waveforms can be used by employing waveforms derived from receivers when these are located within a selected depth interval as well as those receiver waveforms detected when a source is located within the same selected depth interval. As a result, greater accuracy in the measurement can be made with compensation for effects such as cave-ins.

Although a technique in accordance with the invention is particularly useful for measuring sonic characteristics of earth formations such as slowness, the technique may also be useful to measure other characteristics with other forms of energy than acoustic, using electrical related techniques. The term characteristic, therefore, as used herein is intended to include slowness, energy, amplitude or other features deemed of significance in acoustic logging as well as measurements made with other types of energy than acoustic energy. The term slowness as used herein includes those measurements representative of the speed of acoustic waves such as the velocity of waves or their times of arrival from which slowness or velocity can be derived.

It is, therefore, an object of the invention to provide a method and apparatus for improving the measurement of a characteristic of earth formations investigated with a tool from inside a borehole penetrating the earth formations. It is a further object of the invention to provide a method and apparatus with which an earth formation characteristic such as the slowness of sonic waves can be measured with enhanced depth resolution and accuracy.

These and other advantages and objects of the invention can be understood from the following detailed description of several forms of the invention described in conjunction with the drawings.

BRIEF DESCRIPTION OF DRAWINGS

FIG. 5 is a partial flow chart for the processing of waveform signals in accordance with the present invention;

FIG. 6 is a slowness-time-coherence plot and semblance projections obtained with the use of a tool as illustrated in FIG. 1;

FIG. 7 is a diagramatic representation of the motion of a tool with successive source shots to illustrate several techniques for practicing the present invention;

FIG. 8 is a partial flow charge for both receiver section and transmitter section signal processing in accordance with the invention;

FIG. 9 is a diagramatic representation of borehole compensation obtained with a technique in accordance with the invention;

DETAILED DESCRIPTION OF DRAWINGS

Figure 2:
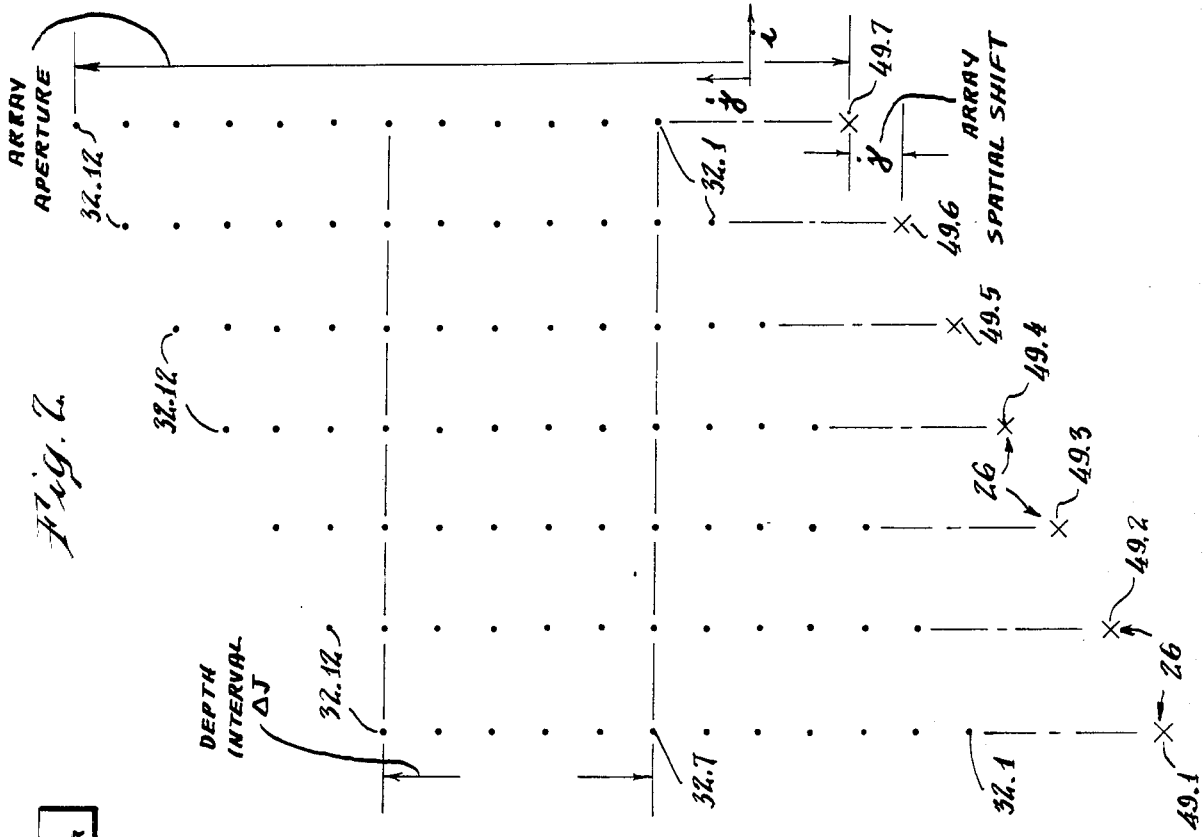
FIG. 2 is a diagramatic representation of the movement of a tool while generating waveforms used to practice the present invention.
Figure 1:
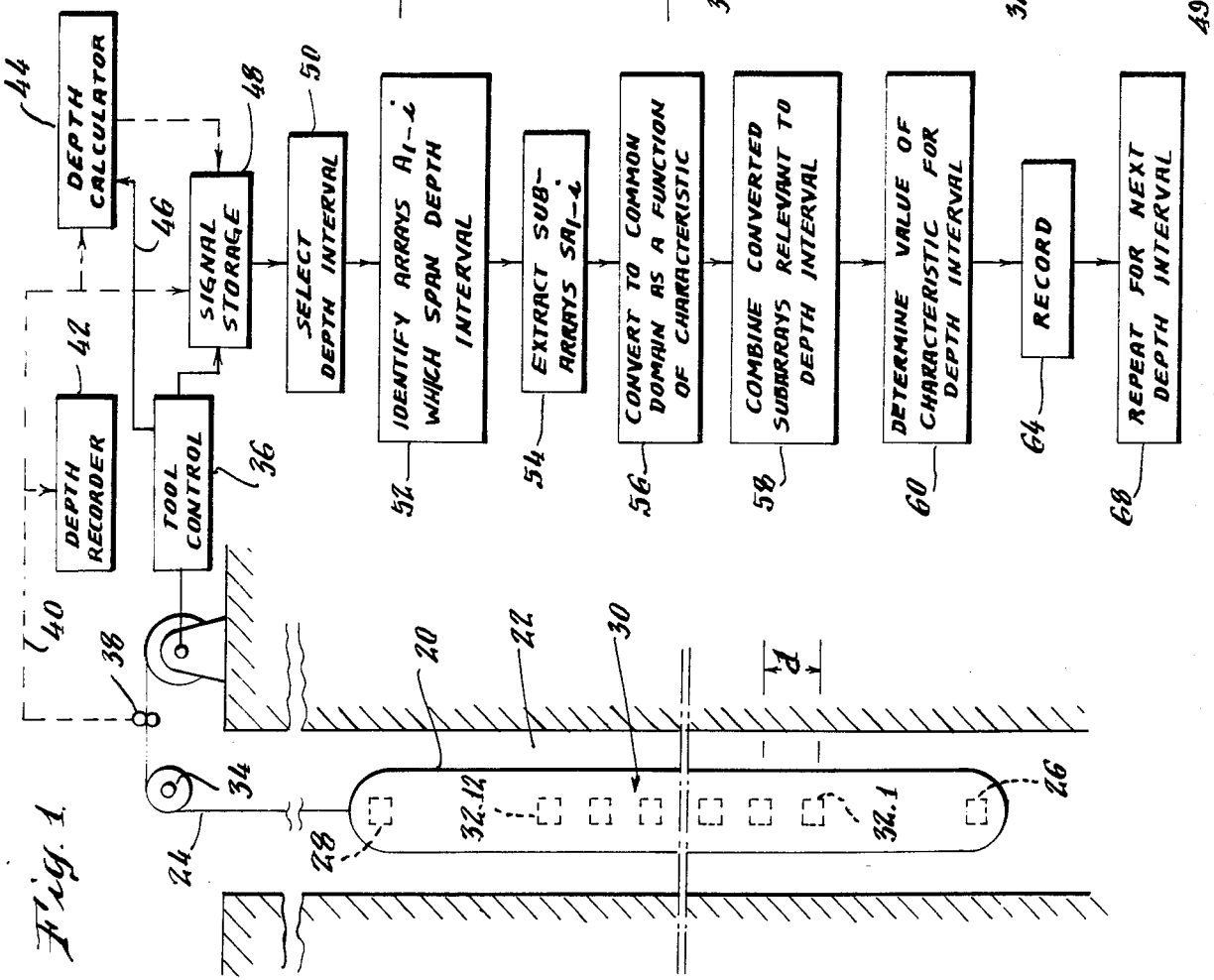
FIG. 1 is a schematic and block diagram of one technique for measuring a characteristic of earth formations in accordance with the invention.

With reference to FIGS. 1 and 2, a tool 20 is shown suspended in a borehole 22 from a multiconductor cable 24. Tool 20 is adapted for movement up and down borehole 22 and includes at least one source 26 of energy, for example a sonic transmitter, and may include a second source 28. An array 30 of energy detecting receivers 32 is shown on tool 20 spaced along the direction of the borehole axis. Tool 20 may employ an array of transmitters 26.

Although tool 20 may be used to investigate a broad range of earth formation characteristics such as resistivity with a resistivity tool, tool 20 is shown herein particularly adapted for a sonic investigation with an array of sonic receivers 32.1-32.12 as, for example, more particularly shown and described in the aforementioned copending patent application to Kimball et al. The contents of that copending patent application are, therefore, incorporated herein by reference thereto.

In the case where a sonic investigation tool is used, the sonic receivers 32 are spaced from each other to form an overall receiver or array aperture that spans between the farthest receivers 32. The distance d between successive receivers is preferably less than a half a wavelength of the sonic signal from the transmitter, for example about a half a foot. The sonic transmitter to the nearest receiver distance is in the range of 5 to 25 feet with 13 feet being a frequently used distance.

As tool 20 is drawn steadily up borehole 22, the sonic transmitter is regularly operated to generate pulses of acoustic energy, part of which passes into and through adjoining earth formations and is detected by receivers 32.1-12. For example, tool 20 may be moved at a speed of about three inches per second (900 ft/hour) and sonic transmitter 26 operated at a rate of, say fifteen times per second so that nominally tool 20 moves about a fifth of an inch, a fraction of its receiver aperture, between successive shots from sonic source 26. The frequency of operation of source 26 may be varied and is generally selected so that each receiver 32.1-12 can at least detect arriving acoustic energy for a sufficiently long time to produce a waveform signal containing waves of interest such as the compressional wave, shear wave, Stoneley wave and modes. The duration of the detected waveform signals may be of the order of five milliseconds long. The waveforms may be digitized at an effectively very high rate so as to sample each detected waveform, for example, every ten microseconds.

Each receiver 32 detects arriving acoustic energy and produces an electrical sonic waveform representative thereof. This waveform, as is well known in the art, represents compressional, shear and Stoneley waves which when accurately detected, may provide significant information about the earth formation. This information may be indirectly inferred such as from the measurement of the slowness of the various acoustic waves, their energy or freqence spectra. The term earth formation characteristic as used herein, therefore, further includes those measurements which are both directly and indirectly related to particular aspects of earth formations penetrated by the borehole.

Although the waveforms are preferably in digital format, they could be processed in analog form. The detection of energy by receivers 32 may take place at one time and processing of the waveform signals in accordance with the invention may be done at another time, or processing may be done while the tool is being moved and operated in the borehole. The term generating of waveform signals as used herein is intended to include both real-time and subsequent use of signals detected from the logging of a borehole.

The waveforms may be digitized downhole and then transmitted up cable 24 past sheave wheel 34 at the surface and to a tool control 36. A depth sensor 38 is used to generate a depth signal on line 40 and which is recorded at 42. A precision depth calculator 44 may be used with tool located accelerometer information on line 40 in a manner and of a type as described in a copending patent application entitled "Method and Apparatus for Measuring the Depth of a Tool in a Borehole" invented by David S. K. Chan and filed in the U.S. Patent and Trademark Office on Apr. 1, 1983 under Ser. No. 437,059 and assigned to the same assignee as for the present invention. With a precision depth calculator such as 44 the correlation between waveform signals of effectively common depth can be more accurately done. The contents of this patent application is, therefore, incorporated herein by reference thereto so that each waveform signal from a receiver 32 can be more accurately associated in signal storage 48 with a particular depth level. The invention may be practiced without such precise depth calculator 44 and rely instead on conventional depth measurements made by monitoring the length of paid out cable 24.

Signal storage 48 stores the digital waveforms with respective depth level signals in a magnetic storage device such as a disc or tape or the like. In the case of tool 20 using twelve receivers 32.1-12, twelve respective waveforms, each composed of 512 digitized measurements or samples are generated in response to each actuation of the source 26. The storage 48 preferably should have sufficient capacity for storing the waveforms for thousands of feet of borehole depth with a repetitive actuation of source 26 sufficient to investigate, for example, every six inches of borehole 22.

In the characteristic measuring technique of the present invention, advantage is made of the redundancy of the information in the waveforms when the aperture of the receiver array 30 shifts only a fraction, j, of its length as shown in FIG. 2 between successive shots 49.1-49.7 of source 26. For example, when a depth interval $\Delta J$, equivalent to say five receiver spacings, d, is selected, then there are, for the illustrated diagram of FIG. 2, seven subarrays of waveforms relevant to the selected depth interval. This selection of the length of the depth interval is conveniently made to coincide with the aperture of six receivers. Different depth intervals may be selected depending upon the desired resolution and accuracy and the number of different subarrays available for a statistical measurement.

In the view of FIG. 2 the spatial shift j of the array 30 between successive shots of source 26 is conveniently made equal to the spacing d between receivers 32. In practice this is not likely to be always the case and more or fewer subarrays may actually be available to contribute to a measurement of a characteristic.

Thus, in applying the measuring technique of the invention, as illustrated in FIG. 1, a suitable depth interval is selected at 50. For a highest depth resolution with a sonic tool 20, the selected depth interval would be equal to the spacing d between adjacent receivers. In such case, for a tool logging speed as illustrated in FIG. 2, twenty two receiver waveforms are available for making a slowness measurement. Assuming a selected depth interval of five receiver spacings, d, a total of forty-two waveforms would be available for a measurement. In each case, however, a substantially greater number of waveforms are available for a measurement by using waveforms attributable to different shots of source 26 than in comparison with the practice of processing data from a single shot as is currently done.

Once the depth interval has been selected, those waveform signals relevant thereto are identified at 52. This may be done by first identifying all of the waveform arrays which span the selected depth interval and then extracting at 54 the largest sub-arrays which lie within the depth interval and are relevant thereto. Those waveforms which were not selected are essentially uncorrelated with respect to the depth interval selected at 50 and can be ignored in the processing of this particular interval though useful for other depth intervals.

Hence, with reference to the illustrative example in FIG. 2, at step 52 the waveforms derived from all receivers 32 for the source firings as shown in FIG. 2 are identified and at step 54 the waveforms from receivers 32.7-12 for shot 49.1, from receivers 36.6-11 for shot 49.2 etc. to receivers 32.1-6 for shot 49.7 are extracted as sub-arrays $SA_{1-6}$ for further processing. The step of extraction may, in practice, be the successive identification of those sub-arrays of waveform signals relevant to the respective depth intervals. The extraction step may further include the placement of these sub-arrays in a particular part of a memory for further processing.

The extracted sub-arrays SA of waveform signals can be each considered to relate to different transmitter-receiver spacings within the selected depth interval and for the receiver section processing example of FIG. 2 to a common shot or time of operation of the source 26.

The waveforms in each sub-array SA extracted at 54 can, to the extent these relate to a common time of operation of source 26, be combined. Since the source 26 moves between successive shots 49 the earth formation between the source 26 and nearest receiver 32 differs for different sub-arrays SA. This means that the waveforms in one sub-array SA can be significantly different from those in any other sub-array SA. Subsequent combining or comparing of waveforms associated with different source firings can thus not be done in a direct manner.

Hence, at step 56 the signals representative of each sub-array SA are first transformed to a common domain of signals. Once each sub-array of signals is converted to such domain, the sub-arrays of converted signals attributable to different source firings and relevant to the selected depth interval can be combined to measure the characteristic.

The conversion of waveform signals at 56 can involve different domains. In a preferred form of the invention the domain is a coherence as a function of the characteristic being measured. Thus, for a sonic tool 20 the domain of signals is a coherence as a function of slowness.

The coherence may be determined from a cross-correlation as a function of the characteristic, such as described in the aforementioned Ingram patents or from a semblance function as described in the previously identified co-pending patent application by Kimball et al. The coherence determination may employ a so-called maximum likelihood method as described in an article entitled "Data Adaptive Spectral Analysis Methods", by R. T. Lacoss and published in Geophysics, Vol. 36, No. 4 (August 1971) pages 661-675. The term "coherence" as used herein, therefore, means a degree of similarity between a plurality of measurements. The similarity may be determined with many techniques including those signal processes with which a degree of similarity between a plurality of waveforms with respect to a particular characteristic is obtained.

As described in greater detail with reference to FIG. 10, the conversion to a common domain is done in a manner whereby partial sums or products, as the case may be, are generated. These partial calculations enable a high speed processing of samples even when a large number of subarrays are employed in a coherence determination.

Following the conversion step 56, the domain of converted signals of different sub-arrays can be combined at 58. The combining step can take a variety of forms such as multiplying coherence values for common values of the characteristic, or averaging the coherence values as a function of the characteristic.

After the combining step 58, the value of the characteristic for the depth interval in question can be determined at 60. This involves the finding of peaks in the coherence values generated at 56. A peak finding technique may be as more particularly described in an aforementioned Ingram patent.

Figure 4:
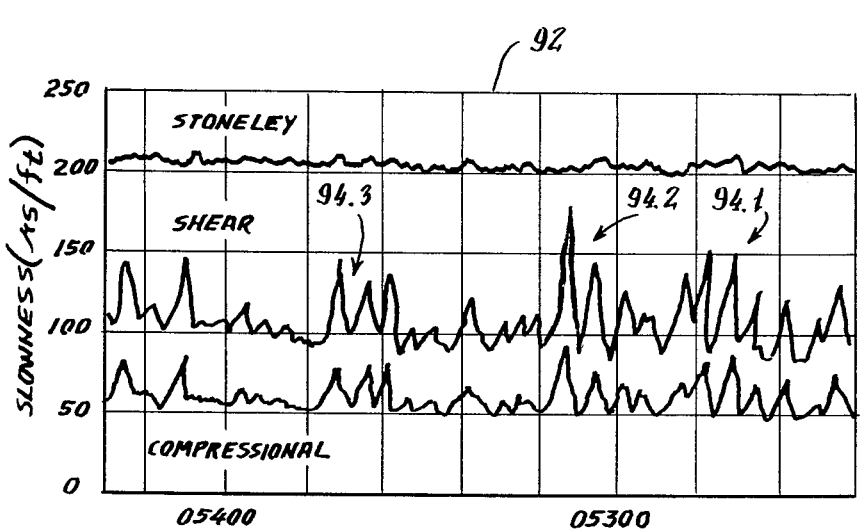

The characteristic values for the peak coherences found at 60 are recorded at 64 as a function of borehole depth such as on a magnetic medium or a visual medium as shown in FIG. 4. The described steps may then be repeated at 68 for the next depth interval.

In one form of the invention as illustrated in FIG. 5, the conversion step 56 includes, for a sonic tool, a computation of coherence as a function of slowness and arrival time at 70 in a manner as described in the aforementioned Kimball et al patent application. This type of conversion produces an array of signals including a measurement of semblance as a function of slowness and arrival time. Such signals can be visualized in a plot 71 as illustrated in FIG. 6 where the contours of higher semblance converge in any one area such as 72 for compressional waves, 74 for shear waves and 76 for Stoneley waves.

Since arrival time is not of interest and varies from sub-array to sub-array, the signals produced in the semblance calculation are further processed as illustrated at 78 in FIG. 5. The step 78 selects the peak semblance found for each slowness value and stores these peak values and the corresponding slowness values at 80. In effect, the step 78 involves a projection of the slowness-time-coherence (STC) plot 71, such as shown in FIG. 6, onto the slowness axis 81.

The steps 70, 78 and 80 are done for each sub-array SA relevant to the depth interval and may then enable a combining step such as by averaging or as described with reference to step 58 in FIG. 1 by multiplying at 82 in FIG. 5 all the stored peak semblance values of different sub-arrays and related to the same slowness value. This results in an array of combined semblances which will have peaks at certain slowness values corresponding to, for example, the compressional, shear and Stoneley waves.

The peak semblance values for each slowness value and related to a particular sub-array are stored in memory. For purposes of illustration the projection of the slowness-time plane is shown plotted at 73.1-5 in FIG. 6 for five sub-arrays $SA_{1-5}$. The plots 73.1-5 may, as shown, exhibit similar peaks at slightly different, though generally corresponding, slowness values.

When the peak semblance values, as represented by curves 73.1-5, are combined by the step 82 in FIG. 5 at common slowness values as suggested by lines 86, an array of combined semblance values is produced as a function of slowness. These latter semblance values can be plotted as shown in FIG. 6 at 88. The combination of curves 73.1-5 provide a curve 88 which statistically yields a more accurate estimate of the slowness values at which these peaks occur.

The location of these peaks may be done at 84 with a peak finding technique.

Figure 3:
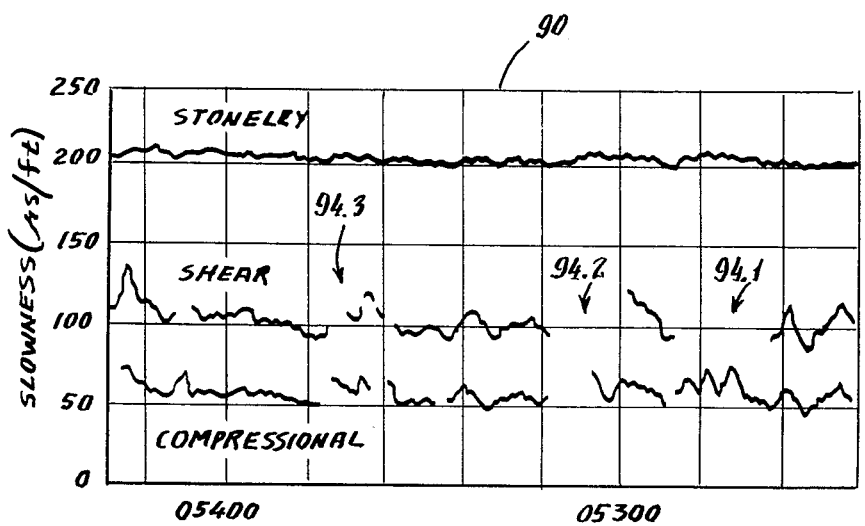
FIG. 3 and FIG. 4 are logs of like earth formations obtained respectively with a known sonic signal processing technique and a signal processing technique in accordance with the present invention.

The advantages of the invention can be particularly appreciated with reference to FIGS. 3 and 4 wherein slowness logs 90, 92 are shown related to the same depth interval of the same borehole. Log 90 is made by using a twelve receiver array with no shot-to-shot processing. Log 92 is made by using a 6 receiver wide sub-array with waveforms from five successive firings of sonic transmitter 26. Comparing these logs 90, 92 significant improvements can be seen such as a better shear and compressional log in the depths between 5260 and 5320 feet and between 5360 and 5380 feet. These improvements extend to both statistical accuracy of the measurement, particularly with respect to shear slowness, as well as the vertical resolution. With a technique in accordance with the invention, improved thin bed resolution in the entire slowness log is obtained. More accurate compressional slowness measurements are achieved when the contrast of slowness in adjacent thin beds are very high, such as in the region from 5358 to 5374 feet. The shear slowness logs can be highly resolved, such as in the regions 5268–5286 feet at 94.1 in FIGS. 3 and 4, 5304–5316 feet at 94.2 and 5358–5374 feet at 94.3.

In the embodiment as illustrated and described with reference to FIG. 2 the respective receiver sub-arrays whose waveforms are combined both span and are relevant to a particular depth interval. This processing in accordance with the invention may be referred to as receiver section processing.

A corresponding measurement of an earth formation characteristic such as slowness can be made by employing transmitter section processing. This can be explained with reference to FIG. 7 in which at the left a receiver section processing 100 is shown for a depth interval 102 similar to that as shown in FIG. 2. On the right in FIG. 7 is a view of a transmitter section processing 104.

As the tool 20 is moved upward to log the earth formation, the locations of transmitter 26 will cross the same depth interval 102 for four different source shots 49. Each of these shots generates an array of waveform signals from the receivers 32. The arrays of waveform signals can be used to derive a different set of sub-arrays from that obtained with receiver section processing 100 yet relevant to the depth interval 102 and useful for measuring the characteristic thereof.

For example, the source shots 49.1-9 are used to provide waveform signals that can be used in receiver section processing 100. Successive source shots 49.10-16 are useful for generating waveform signals relevant to another depth interval while source shots 49.17-20 may be used to produce waveform signals for a transmitter section processing 104 relevant to the depth interval 102.

Transmitter section processing 104 synthesizes sets of sub-arrays SA' each formed of waveform signals detected at essentially common depth. Since the transmitter to receiver spacing is different for each waveform, the moveout of the headwaves across such sub-array SA' is controlled by the speed of sound in the earth formation opposite transmitter 26.

In transmitter processing 104 the source 26 is located within the selected depth interval 102 and the sub-arrays of waveforms are derived using those receiver waveforms wherein the moveout of the headwaves, if present, across the sub-array behave in a detectable way. Stated differently, the sub-arrays of waveform signals are selected or identified so as to be attributable to effectively different times of operation of a source 26 while it is located within the selected depth interval.

The sub-arrays SA' in transmitter section processing 104 are derived from receiver waveform signals detected by different receivers at the same depth. One sub-array SA'$_1$ is thus formed of the waveform signals from receiver 12.1 and attributable to source shot 49.20, of the waveform signals from receiver 12.2 due to shot 49.19 and of waveform signals from receivers 12.3 and 12.4 due to shots 49.18 and 17 respectively. A total of nine such sub-arrays can be formed when four shots of source 26 occur within the selected depth interval 102.

Receiver and transmitter section processing may be done sequentially or separately as shown in FIG. 8 with the steps relevant to receiver section processing 100 being identified by like numerals and steps as described with reference to FIG. 1. Transmitter section processing 104 begins at 108 where the arrays relevant to transmitter section processing 104 are identified by detecting when source 26 is operated within depth interval 102. The sub-arrays relevant to the depth interval 102 are extracted at 110 by extracting those waveform signals which are attributable to the operation of source 26 while it is in the depth interval 102 and were detected by receivers 32 while at a common depth.

Each sub-array SA'$_{1-9}$ of waveforms is transformed at 112 to a common domain such as a coherence as a function of the characteristic in a manner as described with respect to step 56 for receiver section processing. The transformed waveforms are combined at 114 in a manner similar to step 58 and the characteristic of the earth formation for depth interval 102 is determined at 116. In the particular embodiment illustrated in FIG. 7, transmitter section processing 104 employs semblance as the coherence. Thus, step 112 produces the peak semblance value for each slowness value between the waveforms in a sub-array SA'. Since nine sets of sub-arrays SA' are available, the peak semblances for each corresponding coherence value are combined at step 114, such as by averaging or multiplying. A peak finding technique is then applied at 116 to the combined coherence values to determine values for the slowness represented by the peaks.

The measurements of the characteristic as determined at 60 and 116 can be recorded separately at 118. The above described processes are repeated for subsequent depth intervals at 68.

The measurements of the characteristics obtained with receiver and transmitter section processing are independent. Hence, a measurement made with one section may be used to compensate for that of the other section by substitution, or they may be used to enhance each other at 120 such as by averaging or forming a special weighted average. The combined measurements may be recorded at 118.

With multiple shot processing in accordance with the invention, the number of waveforms that can be applied to investigate a depth interval can be selected to accommodate desired statistical accuracy and vertical resolution. Table I illustrates the number of waveforms that can be available for processing with a twelve receiver array and a source 26 that is activated once for each depth interval equal to the spacing d between receivers. In practice the source 26 is operated much more frequently and only those waveforms are used that correspond to the desired depth interval.

TABLE I

| Receiver Section Processing | | | Transmitter Section Processing | | |
| --- | --- | --- | --- | --- | --- |
| # of Receivers | # of Shots | # of Waveforms | # of Shots | # of Sub-arrays | # of Waveforms |
| 12 | 1 | 12 | | | |
| 11 | 2 | 22 | 11 | 2 | 22 |

TABLE I-continued

| Receiver Section Processing | | | Transmitter Section Processing | | |
|---|---|---|---|---|---|
| # of Receivers | # of Shots | # of Waveforms | # of Shots | # of Sub-arrays | # of Waveforms |
| 10 | 3 | 30 | 10 | 3 | 30 |
| 9 | 4 | 36 | 9 | 4 | 36 |
| 8 | 5 | 40 | 8 | 5 | 40 |
| 7 | 6 | 42 | 7 | 6 | 42 |
| 6 | 7 | 42 | 6 | 7 | 42 |
| 5 | 8 | 40 | 5 | 8 | 40 |
| 4 | 9 | 36 | 4 | 9 | 36 |
| 3 | 10 | 30 | 3 | 10 | 30 |
| 2 | 11 | 22 | 2 | 11 | 22 |

Since receiver and transmitter section processing yield independent measurements, a high number of waveforms are available. Even at a short depth interval equal to a single receiver spacing d, both the receiver and transmitter section processing each yield 22 waveforms as compared to 12 waveforms for a single shot. When a lower resolution can be tolerated, the number of waveforms for each section processing increases dramatically to a maximum of 42 waveforms for six or seven receivers and using respectively seven or six separate shots of source 26.

The larger number of waveforms available for single processing increases the time needed to process the samples with a slowness-time coherence technique as described in the aforementioned patent application to Kimball et al.

The calculation of a slowness-time-coherence (STC) plot such as 71 in FIG. 6 may be done as described in the aforementioned Kimball et al patent application. Briefly, this involves the following. In a semblance as a function of slowness and arrival time computation, semblance is calculated for each value of slowness in a range of interest, say from 50 to 250 microseconds per foot, and an arrival time at the first receiver 32 from a range of interest, say from 760 microseconds after a source firing to 5760 microseconds. This can be explained with reference to FIG. 10 showing twelve waveforms 140.1-12 generated by receivers 32.1-12 from a single shot. The technique involves selecting a slowness value S and arrival time t, setting a window W of say, 500 microseconds long (50 samples) and locating the window over the samples of each set of waveform samples depending upon the value of S and the distance of each receiver from the first receiver 32.1. Semblance values are then determined by forming the ratio of stacked energy $E_s$ to unstacked energy $E_u$. For the stacked energy $E_s$ sums are made of all window sample values $a_{1,1} + \ldots a_{1,12}$; to $a_{1,50} + \ldots a_{12,50}$ to form $A_{1,1}$ to $A_{1,50}$. The latter sums A are then added to form a value for the stacked energy $E_s$ for the arrival time t. For the unstacked energy $E_u$ a similar procedure is used except that the samples are first squared and then summed. Semblance for this slowness value S and arrival time t is the ratio of $E_s/(NE_u)$ where N is the number of waveforms to thus form one point in the plot 71 of FIG. 6 and for one shot by source 26.

To complete the data for an entire STC plot 71 and for one shot, the same type of semblance calculations must be made for all window W positions for all arrival times t for its range of interest and all slowness values of interest. It can be appreciated that such semblance calculations could take considerable time when the processing of data from thousands of feet of boreholes is to be considered.

When semblance values are to be formed with sub-arrays from multiple shots, the waveforms for each depth interval increase dramatically and the above mentioned semblance signal processing would take an undesirably long time. Accordingly, a partial sum computational technique is preferably used to reduce the processing time.

Figure 11:
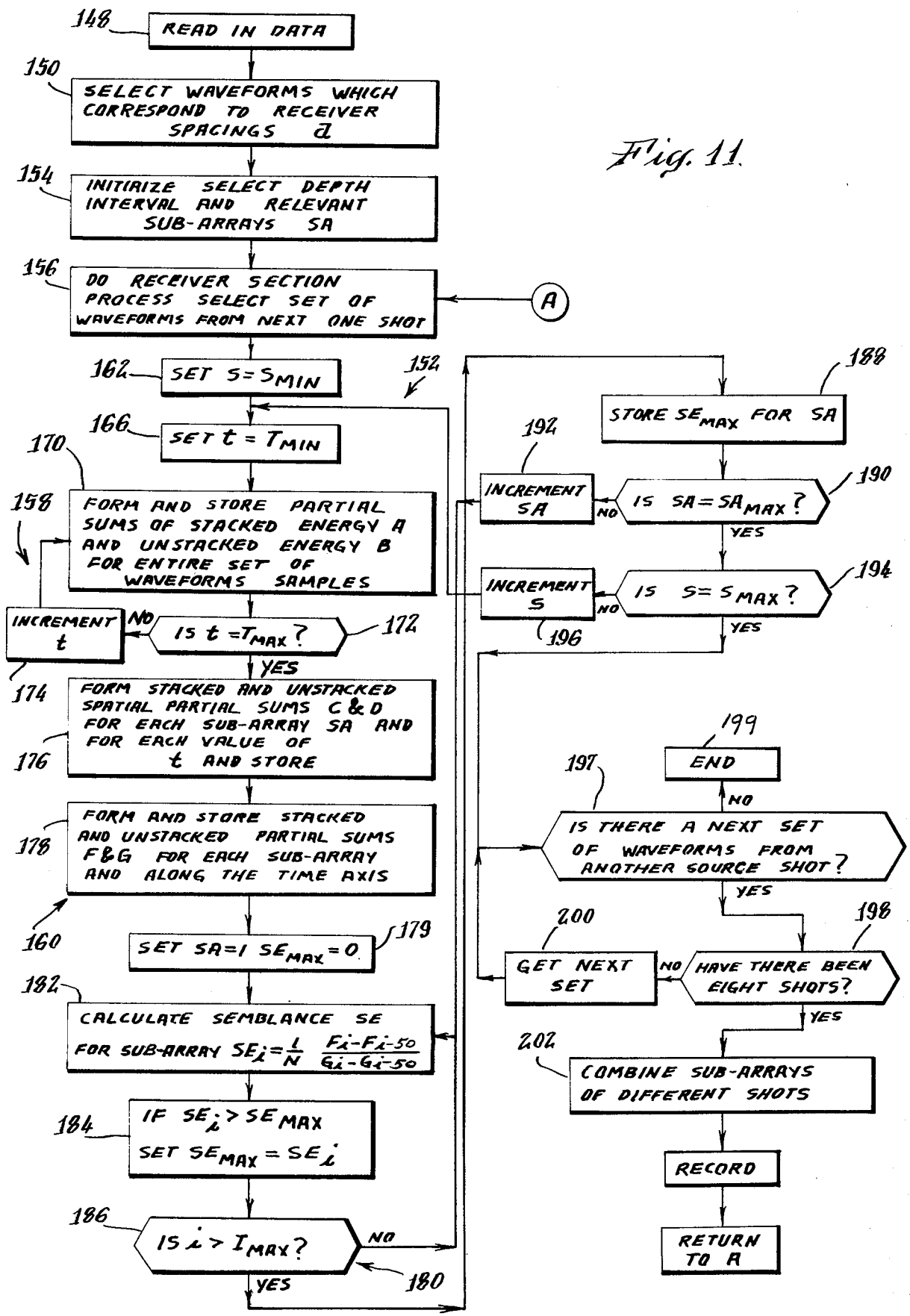
FIG. 11 is a flow chart for a partial sum processing technique in accordance with the invention.

At 148 in FIG. 11 a block of logging data is stored in memory. The data may be generated while a borehole is logged or be drawn from a record produced from a previously logged borehole. The block of data includes waveforms 140 relevant to a large borehole section of, say, several thousand feet long. As previously mentioned, the spacings d between receiver 32.1-12 determines the shortest half wavelengths that can be detected. Hence, a set of waveforms 140 needs to be generated only for each depth interval d. Since the source 26 is actuated so rapidly that many sets of waveforms are generated during each depth interval d, only those sets are selected at 150 in FIG. 11 that coincide with the depth intervals d. The selection may be made downhole, or if the bandwidth of the borehole cable telemetry system permits the transmission of all waveforms, the selection can be made at surface-located signal processing equipment.

Technique 152 in FIG. 11 commences at 154 with an initializing step during which the desired resolution R is determined. This entails the selection of the aperture of sub-arrays SA, i.e. the depth interval. This then determines the number of waveforms 140 in each sub-array SA as well as the number of sub-arrays attributable to different shots.

Assume for purposes of illustration that the resolution R is chosen so that for a receiver section processing and according to table I, a depth interval spanned by five receivers is selected (corresponding to a depth interval equal to four receiver spacings d). In such case eight sub-arrays SA and SA' are available from eight source shots for receiver section processing and from five source shots for transmitter section processing.

At 156 receiver section processing is begun using a partial sum generating technique by selecting a set 142 of waveforms 140.1-12. As shown in FIG. 10, each waveform 140 is made of samples made at regular intervals, say of ten microseconds. The partial sum technique processing employs an inner loop 158 during which spatial and time domain partial sums are produced for stacked and unstacked energies for each sub-array SA for one value of slowness and all values of time in its range of interest.

The inner loop is commenced after setting at 162 the value of the slowness S to a minimum in its range of interest, say from 50 to 250 microseconds. Partial sums are then produced by adding the sample values a of each waveform $140_{1-12}$ along a line, 164.1, see FIG. 10, which initially is located at time $t = T_{MIN}$ as set at 166 in FIG. 11 for the start of a range. The time range is between $T_{MIN}$ and $T_{MAX}$ with specific values set as is deemed desirable for the analysis of waveforms $140_{1-12}$. The line 164.1 intersects each waveform 140 at a point where the sample value may be obtained from a linear interpolation scheme. This uses the values of adjacent samples such as suggested at intersection 168 in FIG. 10 between samples $a_{3,4}$ and $a_{3,5}$.

Partial sums A (for stacked) and B (for unstacked) are then formed and stored at 170 in FIG. 11 for the value of $t = T_{MIN}$ as follows:

| | |
|---|---|
| $A_1 = a_1$ | $B_1 = (b_1)^2$ |
| $A_2 = A_1 + a_3$ | $B_2 = B_1 + (b_2)^2$ |
| $A_3 = A_2 + a_3$ | $B_3 = B_1 + (b_3)^2$ |
| . | . |
| . | . |
| $A_{12} = A_{11} + a_{12}$ | $B_{12} = B_{11} + (b_{12})^2$ |

Figure 10:
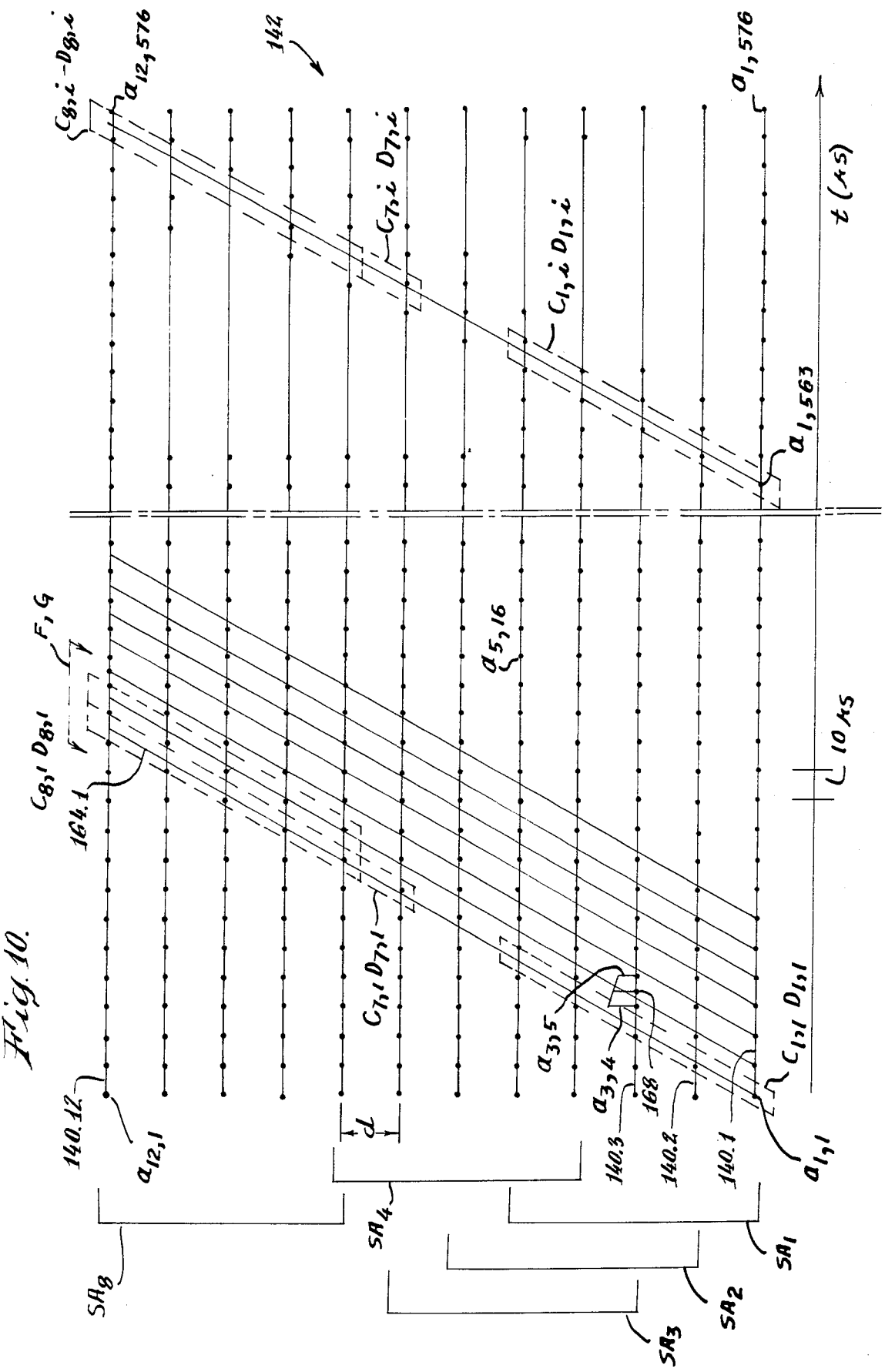
FIG. 10 is a diagramatic representation of a processing technique applied to a set of waveforms.

The subscripts identify a waveform 140, not a particular sample shown in FIG. 10 in the waveform 140. A check is then made at 172 whether partial sums for the full time range for t have been determined. If not, t is incremented at 174. This increment could be set at a value as illustrated in FIG. 10 equal to a time interval, say 40 microseconds, but not more than half the width of the window. Hence, the line 164.2 is the next line along which partial sums A and B are calculated and stored.

This process continues until the test 172 checks out positive. In this respect note that $T_{MAX}$ as illustrated in FIG. 10 corresponds to the placement of a line 164 at such sample on waveform 140.1 that it still intersects a sample on waveform 140.12.

At this point in the signal processing, partial sums A and B have been made for all parallel lines 164 (values of t) representing a common value for slowness, but different values of time.

At 176 the stacked energy C and unstacked energy values D for each subarray SA and each line 164 or value of t is made and stored according to the following relationships as visualized in FIG. 10.

For values of $t=T_{MIN}$ to $T_{MAX}$ using a time incremented loop as 158 the values for C and D are determined as follows:

| | |
|---|---|
| $SA_1\ C_1 = A_5$ | $D_1 = B_5$ |
| $SA_2\ C_2 = A_6 - A_1$ | $D_2 = B_6 - B_1$ |
| $SA_3\ C_3 = A_7 - A_2$ | $D_3 = B_7 - B_2$ |
| . | . |
| . | . |
| $SA_8\ C_8 = A_{12} - A_7$ | $D_8 = B_{12} - B_7$ |

The steps identified at 160 are then entered at 178 by calculating partial sums F (for stacked) and G (for unstacked) along the time domain for the respective sub-arrays $SA_{1\text{-}8}$. This can be visualized with reference to FIG. 10 as calculating partial sums in the time axis direction for values F and G according to the following relationships where i represents the samples along the waveforms 140.

| For sub-array $SA_1$: | |
|---|---|
| $F_1 = C_{1,1}$ | $G_1 = D_{1,1}$ |
| $F_2 = F_1 + C_{1,2}$ | $G_2 = G_1 + D_{1,2}$ |
| $F_3 = F_1 + C_{1,3}$ | $G_3 = G_2 + D_{1,3}$ |
| $F_i = F_{i-1} + C_{1,i}$ | $G_i = G_{i-1} + D_{1,i}$ |
| (stacked) | (unstacked) |
| For sub-array $SA_8$: | |
| $F_1 = C_{8,1}$ | $G_1 = D_{8,1}$ |
| $F_2 = F_1 + C_{8,2}$ | $G_2 = G_1 + D_{8,2}$ |
| $F_3 = F_2 + C_{8,3}$ | $G_3 = G_2 + D_{8,3}$ |
| . | . |
| . | . |
| $F_i = F_{i-1} + C_{8,i}$ | $G_i = G_{i-1} + D_{8,i}$ |
| (stacked) | (unstacked) |

After initializing steps at 179, semblances, SE, are then computed and stored for each sub-array SA at 182 over a window W according to the relationship:

$$SE \text{ for } SA_i = \frac{1(G_i - G_{i-50})}{5(F_i - F_{i-50})}$$

where the divider 5 is used to bring semblance in a range of values from 0 to 1 and reflects the number of source shots in the depth interval selected at step 154.

Thus, assuming a window W of fifty samples, the first semblance $SE_1$ for each sub-array with the window W at the desired first location is $$SE_1 = \frac{1}{5} \frac{F_{50}}{G_{50}}.$$

The second semblance for the second window location at, for example, location fifty four is $$SE_2 = \frac{F_{54} - F_4}{G_{54} - G_4}.$$

The semblances SE are computed first for one sub-array SA and the maximum semblance extracted with a peak selection technique at step 184. This peak selection corresponds to the projection on the slowness axis as described with reference to FIGS. 5 and 6 where the maximum semblance for each slowness value is determined from a semblance-time-coherence data set. When all semblances SE have been calculated for all window positions for a sub-array SA as determined at 186, the value of the maximum semblance, the identification of the sub-array SA and the depth interval to which the sub-arrays SA are relevant are stored at 188.

The same semblance calculations are done for the other seven sub-arrays SA in the same way as these were determined at 154. This involves looping through steps 190, 192, 182-190 until test 190 provides a positive answer.

At this point the maximum semblance values SE for the sub-arrays SA have been determined for one slowness value S. Hence, at 194 a test is made whether semblances have been determined for all slowness values. If negative, the value S is incremented at 196 and the process returned to step 160. This continues until test 194 yields an affirmative answer at which time, for each sub-array $SA_{1\text{-}8}$ in the set 142 (see FIG. 10) of waveforms 140, there has been obtained and stored maximum semblance values SE for each value of slowness S.

At 197 a test is made whether there are additional waveform sets. If not, the program is stopped at 199; however, if there are, a test is made at 198 whether the first eight sets of waveforms attributable to different source shots have occurred. If not, the process either awaits at 200 the next set if the processing is done in real time, or retrieves it for processing commencing at step 156 if the data is available. In the event eight separate sets of waveforms have been processed, a first combining process can begin at 202 using the maximum semblance values SE for the same slowness values in the sub-arrays SA. The combining step may be as described with reference to step 58 in FIG. 1 and can be visualized with reference to FIG. 12.

Figure 12:
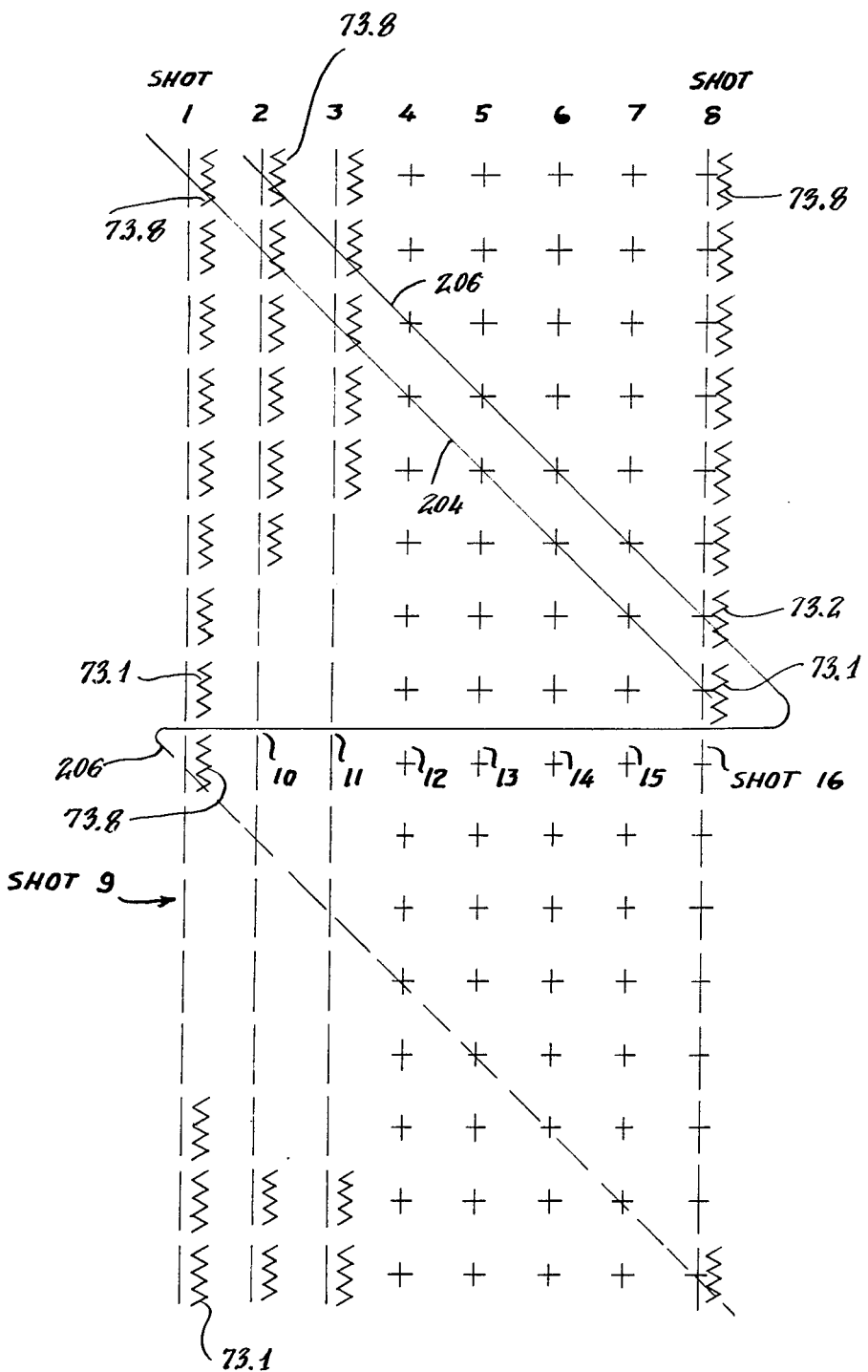
FIG. 12 is a diagramatic representation of a process in accordance with the invention for combining coherence values of different short shots.

In FIG. 12 the maximum semblance plots 73 for each sub-array $SA_{1\text{-}8}$ are shown as these may be stored in memory for different source shots and corresponding to those shots occurring at the depth intervals d as selected at 150 in FIG. 11. The semblance values for corresponding slowness values S for eight sub-arrays for a common depth interval 102 (see FIG. 2) are combined, for example, by combining along line 204 plot 73.8 of shot 1 with plot 73.7 of shot 2, etc. to plot 73.1 for shot 8. The combined sub-array semblances are then recorded at 204 for the relevant depth interval.

The above described steps are repeated for the next sets 142 of waveforms from eight different shots. Those previously determined semblance plots 73 that cannot be used with other source shots can be discarded. Thus, for the next depth interval the plot 73.8 of shot 2 is combined with plot 73.7 of shot 3 etc. to plot 73.1 for shot 9 while the plots 73 below the line 204 for shots 1-8 can be discarded.

With a partial sum generating technique, the processing time can be held to reasonable durations. Memory storage needs can be reduced in comparison with a technique for computing slowness-time-coherence values for each set of sub-arrays SA.

The receiver section processing 100 makes use of energy or waves which travel beneath the depth interval 102 while the reverse is true for transmitter section processing 104. Borehole compensation is then achieved for a sonic investigation by averaging the characteristics measured with source and receiver section estimates. This can be explained with reference to FIG. 9 in which a portion of borehole 22 is shown with a cave-in 130. The cave-in 130 is of precise cylindrical shape for illustration only since in practice a more irregular shape is likely to be encountered.

If the sonic waves have to travel a longer path through the slower fluid to reach the distant part of the sub-arrays, the slowness estimates will be higher for one section in comparison with the other section. A cave-in, therefore, biases the slowness estimate by the transmitter section 104 one way and that by the receiver section 100 an opposite way. By averaging the two estimates as done at 120 in FIG. 8, the biases tend to cancel and greatly reduce the influence of the cave-in 130.

Having thus described several embodiments for practicing the invention, its advantages can be appreciated. Variations from the illustrations herein may be implemented by one skilled in the art. For example, the selected depth interval can be varied from as small as the spacing between a pair of adjacent receivers to as large as there exists an overlap of information between successive operations of a source. The transmitter section processing may include use of a plurality of sources. The invention may be used to derive other characteristics such as coherent energy, i.e. the projected coherent energy at which semblance is the largest as well as other energy-peak-related features.

What is claimed is:

1. A method for measuring a characteristic of earth formations penetrated by a borehole from investigative energy generated by a source located on a tool which is moved along the borehole and where the energy is detected along an aperture as defined by a plurality of receiver locations spaced along the direction of the borehole axis of the tool and wherein signals are generated respectively representative of the energy detected at said locations, comprising the steps of:

selecting a depth interval which is less in length than said aperture;

identifying signals relevant to the selected depth interval and including signals generated as a result of different times of operation of the source;

converting different sub-arrays of identified signals to a common domain of signals representing values of a coherence between the signals in a respective sub-array as a function of values of said characteristic;

combining converted signals of effectively common characteristic values in a preselected manner to determine at least one value for said characteristic for that depth interval;

repeating said steps for different depth intervals; and forming a tangible record as a function of borehole depth from the determined values of the characteristic.

2. The method for measuring a characteristic of earth formations as claimed in claim 1 wherein said converting step comprises the step of converting sub-arrays of signals which are respectively attributable to effectively common times of operation of the source to a said domain of signals representative of a coherence as a function of said characteristic; and wherein said combining step comprises the step of combining the coherence values for converted signals attributable to different times of operation of the source to determine at least one value for said characteristic for that depth interval.

3. The method for measuring a characteristic of earth formations as claimed in claim 1 wherein said converting step comprises the step of converting sub-arrays of signals which are detected at an effectively common depth and are attributable to effectively different times of operation of the source while it is located within the selected depth interval to a said domain of signals representative of a coherence as a function of said characteristic; and wherein said combining step comprises the step of combining coherence values for converted signals attributable to effectively common times of operation of the source while it is located within the selected depth interval to determine at least one value for said characteristic for that depth interval.

4. The method for measuring a characteristic of earth formations as claimed in claim 1 wherein said converting step comprises the steps of:

converting sub-arrays of signals which are attributable to effectively common times of operation of the source to a domain of first signals representative of coherence values as a function of said characteristic; and converting sub-arrays of signals which are attributable to effectively different times of operation of the source while it is located within the selected depth interval to a domain of second signals representative of a coherence as a function of said characteristic; and wherein said combining step comprises the steps of:

combining coherence values of first signals to determine at least one value for said characteristic for that depth interval; and combining coherence values of second signals to determine at least a second value for said characteristic for that depth interval.

5. The method for measuring a characteristic of earth formations as claimed in claim 4 and further comprising the step of:

combining said first and second values of said characteristic in a predetermined manner to determine a borehole compensated value of the characteristic for that depth interval.

6. A method for measuring slowness of acoustic waves introduced into earth formations from inside a borehole penetrating the earth formations wherein the acoustic waves are caused by acoustic pulses generated by a repetitively actuated source located on a tool which is moved along the borehole to generate waveform signals representative of acoustic waves detected at a plurality of receiver locations spaced along the direction of the borehole axis of the tool comprising the steps of:
  selecting a depth interval which is less in length than the distance between the farthest of said receiver locations;
  identifying signals relevant to said selected depth interval;
  converting identified signals which are attributable to effectively common times of operation of the source to a domain of signals representating values of a coherence as a function of values of said slowness:
  combining coherence values of converted signals attributable to different times of operation of the source in a preselected manner to determine at least one value for said slowness for that depth interval;
  repeating said steps for different depth intervals; and
  forming a tangible record as a function of borehole depth from the determined values of the slowness.

7. The method for measuring slowness of earth formations as claimed in claim 6 wherein the combining step includes the step of combining coherence values related to effectively common values of the slowness; and
  deriving from said combined coherence values said at least one value of said slowness.

8. The method for measuring a slowness of earth formations as claimed in claim 6 and further comprising the steps of:
  converting identified signals which are attributable to effectively different times of operation of the source while it is located within the selected depth interval to a domain of signals representative of a coherence as a function of said slowness; and
  combining coherence values of the latter converted signals which are attributable to effectively common times of operation of the source while it is located within the selected depth interval to determine at least one other value for said slowness for that selected depth interval.

9. The method for measuring a slowness of earth formations as claimed in claim 8 and further comprising the step of:
  combining related values of the slowness for the same depth interval as determined by different combining steps to provide a borehole compensated value for said slowness and for that selected depth interval.

10. The method for measuring a slowness of earth formations as claimed in claim 6 wherein said converting step comprises the steps of:
  generating a first array of values of the slowness of acoustic waves as a function of coherence values for a range of arrival times of acoustic energy at a receiver location;
  generating a second array of values of slowness of acoustic waves as a function of the best coherence thereof for said range of arrival times.

11. The method for measuring a slowness of earth formations as claimed in claim 10 wherein said combining step comprises:
  combining as a function of slowness those coherence values of said second array of slowness values for converted signals attributable to different times of operation of the source and respectively associated with the same slowness value;
  selecting from the latter combined coherence values the slowness values representative of peaks of the combined coherence values; and
  forming a tangible record as a function of borehole depth of said latter slowness values.

12. The method for measuring a slowness of earth formations as claimed in claim 6 wherein said converting step comprises the steps of:
  generating a first array of values of the slowness of acoustic waves as a function of semblance values for a range of arrival times of acoustic energy at a receiver location;
  generating a second array of values of slowness of acoustic waves as a function of the best semblance thereof for said range of arrival times.

13. The method for measuring a slowness of earth formations as claimed in claim 12 wherein said combining step comprises:
  combining as a function of slowness those semblance values of said second array of slowness values for converted signals attributable to different times of operations of the source and respectively associated with the same slowness value;
  selecting from the combined semblance values the slowness values representative of peaks of the combined semblance values; and
  forming a tangible record as a function of borehole depth of said latter slowness values.

14. A method for measuring a slowness of acoustic waves introduced into earth formations from inside a borehole which penetrates the earth formations wherein the acoustic waves are caused by acoustic pulses generated by a repetitively actuated source located on a tool which is moved along the borehole to generate waveform signals representative of acoustic waves detected at a plurality of receiver locations spaced along the direction of the borehole axis of the tool, comprising the steps of:
  selecting a depth interval which is less in length than the distance between the farthest of said receiver locations;
  identifying signals relevant to said selected depth interval;
  converting sub-arrays of identified signals which relate to a common depth and are attributable to effectively different times of operation of the source while it is located within the selected depth interval to a domain of signals representing values of a coherence as a function of values of said slowness;
  combining coherence values for sub-arrays of converted signals attributable to effectively common times of operation of the source while it is located within the selected depth interval to determine at least one value for said slowness for that depth interval;
  repeating said steps for different depth intervals; and forming a tangible record as a function of borehole depth from the determined values of the slowness.

15. The method for measuring a slowness of earth formations as claimed in claim 14 and further comprising the steps of:
converting identified signals which are attributable to effectively common times of operation of the source to a domain of signals representing values of a coherence as a function of value of said slowness;
combining the latter coherence values of converted signals attributable to different times of operation of the source in a preselected manner to determine another value for said slowness for that depth interval.

16. The method for measuring a slowness of earth formations as claimed in claim 15 and further comprising the step of:
combining related values of the slowness as determined by said prior combining steps to provide a borehole compensated value for said slowness.

17. The method for measuring a slowness of earth formations as claimed in claim 14 wherein said converting step comprises the steps of:
generating a first array of values of the slowness of acoustic waves as a function of coherence values for a range of arrival times of acoustic energy at a receiver location;
generating a second array of values of slowness of acoustic waves as a function of the best coherence thereof for said range of arrival times.

18. The method for measuring a slowness of earth formations as claimed in claim 17 wherein said combining step comprises:
combining coherence values of like slowness values;
selecting from the latter combined coherence values the slowness values representative of peaks of the combined coherence values; and
forming a tangible record as a function of borehole depth of said latter slowness values.

19. The method for measuring a slowness of earth formations as claimed in claim 17 wherein the step of generating said first array of values generates slowness values as a function of semblance.

20. An apparatus for measuring a characteristic of earth formations penetrated by a borehole from investigative energy generated by a source located on a tool which is moved along the borehole and wherein signals are generated respectively representative of the energy detected along an aperture defined by receivers spaced at locations along the direction of the borehole axis of the tool, comprising:
means for defining successive depth intervals which are less in length than said aperture;
means for identifying signals relevant to respective selected depth intervals and including signals generated as a result of different times of operation of the source;
means for transforming for each selected depth interval sub-arrays of identified signals to a domain of signals representing values of a coherence between the signals in a respective sub-array as a function of values of said characteristic;
means for combining coherence values corresponding to common characteristic values and relevant to respective depth intervals;
means for deriving from the combined coherence values at least one value for said characteristic for said selected depth intervals; and means for generating a tangible record as a function of borehole depth from the derived values of the characteristic for said selected depth intervals.

21. The apparatus for measuring a characteristic of earth formations as claimed in claim 20 wherein said means for transforming includes means for converting sub-arrays of signals that are respectively attributable to effectively common times of operation of the source to a said domain of signals representative of a coherence as a function of said characteristic; and
wherein said combining means includes means for combining the coherence values for converted signals attributable to different times of operation of the source.

22. The apparatus for measuring a characteristic of earth formations as claimed in claim 20 wherein said means for transforming includes means for converting sub-arrays of signals which have been detected at an effectively common depth and are attributable to effectively different times of operation of the source while it is located within a respective selected depth interval to a said domain of signals representative of a coherence as a function of said characteristic; and
wherein said combining means comprises means for combining coherence values for sub-arrays of converted signals attributable to effectively common times of operation of the source while it is within respective depth intervals.

23. The apparatus for measuring a characteristic of earth formations as claimed in claim 20 wherein said means for transforming comprises:
means for converting sub-arrays of signals which are attributable to effectively common times of operation of the source to a domain of first signals representative of coherence values as a function of said characteristic; and
means for converting sub-arrays of signals which are attributable to effectively different times of operation of the source while it is located within the selected depth interval to a domain of second signals representative of coherence values as a function of said characteristic; and
wherein said means for combining comprises:
means for combining coherence values of first signals to determine at least one value for said characteristic for that depth interval; and
means for combining coherence values of second signals to determine at least a second value for said characteristic for that depth interval.

24. The apparatus for measuring a characteristic of earth formations as claimed in claim 23 and further comprising:
means for combining said first and second values of said characteristic in a predetermined manner to determine a borehole compensated value of the characteristic for that depth interval.

25. An apparatus for measuring slowness of acoustic waves introduced into earth formations from inside a borehole penetrating the earth formations wherein the acoustic waves are caused by acoustic pulses generated by a repetitively actuated source located on a tool which is moved along the borehole to generate waveform signals representative of acoustic waves detected at a plurality of receiver locations spaced along the direction of the borehole axis of the tool comprising:
means for selecting depth intervals which are less in length than the distance between the farthest of said receiver locations;

means for identifying signals relevant to said selected depth intervals;

means for converting identified signals which are attributable to effectively common times of operation of the source to a domain of signals representating values of a coherence as a function of values of said slowness;

means for combining coherence values of converted signals attributable to different times of operation of the source in a preselected manner to determine at least one value for said slowness for the depth interval; and means for forming a tangible record as a function of borehole depth from the determined values of the slowness.

26. The apparatus for measuring slowness of earth formations as claimed in claim 25 wherein the combining means includes means for combining coherence values related to effectively common values of the slowness; and means for deriving from said combined coherence values said at least one value of said slowness.

27. The apparatus for measuring a slowness of earth formations as claimed in claim 25 and further comprising:

means for converting identified signals which are attributable to effectively different times of operation of the source while it is located within respective selected depth intervals to a domain of signals representative of a coherence as a function of said slowness; and means for combining coherence values of the latter converted signals which are attributable to effectively common times of operation of the source while it is located within the selected depth interval to determine at least one other value for said slowness for said respective selected depth intervals.

28. The apparatus for measuring a slowness of earth formations as claimed in claim 27 and further comprising:

means for combining related values of the slowness for the same depth interval as determined by said different combining means to provide a borehole compensated value for said slowness and for that selected depth interval.

29. The apparatus for measuring a slowness of earth formations as claimed in claim 25 wherein said converting means comprises:

means for generating a first array of values of the slowness of acoustic waves as a function of coherence values for a range of arrival times of acoustic energy at a receiver location;

means for generating a second array of values of slowness of acoustic waves as a function of the best coherence thereof for said range of arrival times.

30. The apparatus for measuring a slowness of earth formations as claimed in claim 29 wherein said combining means comprises:

means for combining as a function of slowness those coherence values of said second array of slowness values for converted signals for converted signals attributable to different times of operation of the source and respectively associated with the same slowness value;

means for selecting from the latter combined coherence values the slowness values representative of peaks of the combined coherence values; and means for forming a tangible record as a function of borehole depth of said latter slowness values.

31. The method for measuring a slowness of earth formations as claimed in claim 25 wherein said means for converting comprises:

means for generating a first array of values of the slowness of acoustic waves as a function of semblance values for a range of arrival times of acoustic energy at a receiver location;

means for generating a second array of values of slowness of acoustic waves as a function of the best semblance thereof for said range of arrival times.

32. The apparatus for measuring a slowness of earth formations as claimed in claim 31 wherein said combining means comprises:

means for combining as a function of slowness those semblance values of said second array of slowness values for converted signals attributable to different times of operations of the source and respectively associated with the same slowness value;

means for selecting from the combined semblance values the slowness values representative of peaks of the combined semblance values; and means for forming a tangible record as a function of borehole depth of said latter slowness values.

33. An apparatus for measuring a slowness of acoustic waves introduced into earth formations from inside a borehole which penetrates the earth formations wherein the acoustic waves are caused by acoustic pulses generated by a repetetively actuated source located on a tool which is moved along the borehole to generate waveform signals representative of acoustic waves detected at a plurality of receiver locations spaced along the direction of the borehole axis of the tool, comprising:

means for selecting depth intervals which are less in length than the distance between the farthest of said receiver locations;

means for identifying signals relevant to said selected depth intervals;

means for converting sub-arrays of identified signals which relate to a common depth and are attributable to effectively different times of operation of the source while it is located within the selected depth interval to a domain of signals representing values of a coherence as a function of values of said slowness;

means for combining coherence values for sub-arrays of converted signals attributable to effectively common times of operation of the source while it is located within the selected depth interval to determine at least one value for said slowness for that depth interval; and means for forming a tangible record as a function of borehole depth from the determined values of the slowness.

34. The apparatus for measuring a slowness of earth formations as claimed in claim 33 and further comprising:

means for converting identified signals which are attributable to effectively common times of operation of the source to a domain of signals representing values of a coherence as a function of value of said slowness;

means for combining the latter coherence values of converted signals attributable to different times of operation of the source in a preselected manner to determine another value for said slowness for that depth interval.

35. The apparatus for measuring a slowness of earth formations as claimed in claim 34 and further comprising:
means for combining related values of the slowness as determined by said prior combining means to provide a borehole compensated value for said slowness.

36. The apparatus for measuring a slowness of earth formations as claimed in claim 33 wherein said means for converting comprises:
means for generating a first array of values of the slowness of acoustic waves as a function of coherence values for a range of arrival times of acoustic energy at a receiver location; and
means for generating a second array of values of slowness of acoustic waves as a function of the best coherence thereof for said range of arrival times.

37. The apparatus for measuring a slowness of earth formations as claimed in claim 36 wherein said means for combining comprises:
means for combining coherence values of like slowness values;
means for selecting from the latter combined coherence values the slowness values representative of peaks of the combined coherence values; and
means for forming a tangible record as a function of borehole depth of said latter slowness values.

38. The apparatus for measuring a slowness of earth formations as claimed in claim 36 wherein the means of generating said first array of values generates values as a function of semblance.

39. A method for measuring a characteristic of earth formations penetrated by a borehole from a plurality of waveforms generated by an array of receivers spaced from each other on a tool along the axis of the borehole and generating the waveforms in sets in response to respective repetetive actuations of a source of energy spaced from the receivers on the tool comprising the steps of:
selecting a depth interval which is less in length than the length of the array of receivers and is representative of a desired depth resolution of the measured characteristic;
identifying those sets of waveforms generated in response to different actuations of the source and as to which sets the energy of the source traversed said selected depth interval;
identifying from the latter sets of waveforms a plurality of sub-arrays of waveforms attributable to different actuations of the source, with the waveforms in each sub-array being generated by receivers while they are located in said selected depth interval;
converting each sub-array of waveforms to a domain of signals representing values of a coherence between the signals in a sub-array as a function of values of the characteristic;
combining coherence values of common characteristic values of converted signals from different sub-arrays to determine values of said characteristic for that depth interval;
repeating said steps for different depth intervals; and
forming a tangible record as a function of borehole depth from the determined values of the characteristic.

40. The method for measuring a characteristic as claimed in claim 39 wherein the converting step comprises the steps of:
forming for each said set of identified waveforms arrays of partial sums of waveform values at waveform locations determined as a function of a first value of the characteristic, the spacings between receivers, and a first arrival time of the source energy at a receiver;
forming said partial sums for successive arrival times over a preselected range thereof and for said first value of the characteristic;
forming from said partial sums partial sub-array sums of said waveform values for waveform locations included in respective sub-arrays covered by the identified set of waveforms;
forming partial time domain sums from the partial sub-array sums;
determining coherence values from said partial time domain sums for each said sub-arrays covered by the set of waveforms; and
repeating said partial sum forming steps and coherence determining step for a predetermined range of values of said characteristic.

41. The method for measuring a characteristic as claimed in claim 40 wherein said steps of forming partial sums includes forming partial sums of stacked energy and partial sums of unstacked energy.

42. A method for measuring a characteristic of earth formations penetrated by a borehole from a plurality of waveforms generated by an array of receivers spaced from each other on a tool along the axis of the borehole and generating the waveforms in sets in response to respective repetetive actuations of a source of energy spaced from the receivers on the tool comprising the steps of:
selecting a depth interval which is less in length than the length of the array of receivers and is representative of a desired depth resolution of the measured characteristic;
identifying those sets of waveforms generated in response to different actuations of the source and as to which sets the energy of the source traversed said selected depth interval;
identifying from the latter sets of waveforms a plurality of sub-arrays of waveforms attributable to different actuations of the source, with the waveforms in each sub-array being generated by different receivers while they are located at a common depth while said source is located within the selected depth interval;
converting each sub-array of waveforms to a domain of signals representing values of a coherence between the signals in a sub-array as a function of values of the characteristic;
combining coherence values of common characteristic values of converted signals from different sub-arrays to determine values of said characteristic for that depth interval;
repeating said steps for different depth intervals; and
forming a tangible record as a function of borehole depth from the determined values of the characteristic.

43. The method for measuring a characteristic as claimed in claim 42 wherein the converting step comprises the steps of:
forming for each said set of identified waveforms arrays of partial sums of waveform values at waveform locations determined as a function of a first value of the characteristic, the spacings between receivers, and a first arrival time of the source energy at a receiver;

forming said partial sums for successive arrival times over a preselected range thereof and for said first value of the characteristic;

forming from said partial sums partial sub-array sums of said waveform values for waveform locations included in respective sub-arrays covered by the identified set of waveforms;

forming partial time domain sums from the partial sub-array sums;

determining coherence values from said partial time domain sums for each said sub-arrays covered by the set of waveforms; and repeating said partial sum forming steps and coherence determining step for a predetermined range of values of said characteristic.

44. The method for measuring a characteristic as claimed in claim 43 wherein said steps of forming partial sums includes forming partial sums of stacked energy and partial sums of unstacked energy.

* * * * *